(12) United States Patent
Horling et al.

(10) Patent No.: US 9,951,427 B2
(45) Date of Patent: Apr. 24, 2018

(54) COATING ARRANGEMENT

(75) Inventors: Peter Horling, Mainberg (DE); Tristan Kaiser, Schweinfurt (DE); Hans-Jürgen Liesegang, Schortens (DE); Reiner Wagner, Schwebheim (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 12/745,147

(22) PCT Filed: Nov. 21, 2008

(86) PCT No.: PCT/EP2008/009850
§ 371 (c)(1),
(2), (4) Date: Nov. 10, 2010

(87) PCT Pub. No.: WO2009/068225
PCT Pub. Date: Jun. 4, 2009

(65) Prior Publication Data
US 2011/0045226 A1    Feb. 24, 2011

(30) Foreign Application Priority Data
Nov. 29, 2007    (DE) .................. 10 2007 057 906

(51) Int. Cl.
*C23C 30/00* (2006.01)
*C25D 5/12* (2006.01)
(Continued)

(52) U.S. Cl.
CPC ............ *C23C 30/00* (2013.01); *C23C 28/023* (2013.01); *C25D 5/12* (2013.01); *F16B 2/005* (2013.01);
(Continued)

(58) Field of Classification Search
CPC .......... F16B 2/005; F16D 1/033; F16D 1/076; C23C 30/005
(Continued)

(56) References Cited

U.S. PATENT DOCUMENTS

| 57,771 A | * | 9/1866 | Roach ........................... 403/337 |
| 2,879,092 A | * | 3/1959 | Grobel et al. ................ 403/337 |

(Continued)

FOREIGN PATENT DOCUMENTS

| DE | 2425524 A1 | 12/1975 |
| DE | 2622893 A1 | 1/1977 |

(Continued)

*Primary Examiner* — Jonathan P Masinick
(74) *Attorney, Agent, or Firm* — Bryan Peckjian; SKF USA Inc. Patent Dept.

(57) ABSTRACT

A coating arrangement has the following characteristics: —particles having a scratch hardness greater than or equal to 9 and a median grain size that can be determined, —a coating having a thickness equaling approximately half the median grain size, —a coating carrier with a surface comprising recesses, wherein a portion greater than 85% of the recesses compared to a surface surrounding the associated recess is designed with a depth smaller than approximately 10% and/or a opening width smaller than or equal to approximately 15% of the coating thickness, and —the coating is applied to the surface of the coating carrier and surrounds the particles at least at a lower region oriented toward the coating carrier.

23 Claims, 3 Drawing Sheets

(51) Int. Cl.
*F16B 2/00* (2006.01)
*F16D 1/076* (2006.01)
*C23C 28/02* (2006.01)

(52) U.S. Cl.
CPC ........... *F16D 1/076* (2013.01); *Y10T 428/213* (2015.01); *Y10T 428/218* (2015.01); *Y10T 428/24355* (2015.01); *Y10T 428/24521* (2015.01); *Y10T 428/24612* (2015.01)

(58) Field of Classification Search
USPC .................................................. 403/335–337
See application file for complete search history.

(56) References Cited

U.S. PATENT DOCUMENTS

| | | | |
|---|---|---|---|
| 3,077,638 A * | 2/1963 | Hickam | 264/259 |
| 4,075,371 A | 2/1978 | Patel | |
| 4,882,215 A | 11/1989 | Ushio et al. | |
| 5,259,280 A * | 11/1993 | Hoy | 81/436 |
| 6,347,905 B1 * | 2/2002 | Lukschandel | 403/404 |
| 6,869,081 B1 * | 3/2005 | Jenco | 277/611 |
| 8,025,134 B2 * | 9/2011 | Foge et al. | 188/251 A |
| 2003/0087097 A1 * | 5/2003 | Lukschandel et al. | 428/408 |
| 2004/0043193 A1 * | 3/2004 | Chen et al. | 428/143 |

FOREIGN PATENT DOCUMENTS

| | | |
|---|---|---|
| DE | 2538967 A1 | 3/1977 |
| DE | 3877604 T2 | 5/1993 |
| EP | 0521256 A2 | 1/1993 |
| EP | 0961038 A1 | 12/1999 |
| EP | 1300485 A1 | 4/2003 |
| EP | 1564418 A1 | 8/2005 |
| JP | 5162080 A | 6/1993 |
| WO | WO0148376 A2 | 7/2001 |
| WO | WO2004005585 A1 | 1/2004 |

* cited by examiner

COATING ARRANGEMENT

BACKGROUND OF THE INVENTION

The invention relates to a coating arrangement.

An entire array of friction-increasing coatings are known from the prior art, the coefficients of adhesive friction thus achievable still being in need of improvement for many applications, however.

SUMMARY OF THE INVENTION

An object of the invention is therefore to provide an improved coating arrangement, using which high coefficients of adhesive friction are achievable in particular.

The object is achieved by the subject matter of the exemplary embodiment presented in Para [0005] below. Other advantageous enhancements and modified embodiments are described herein.

In one exemplary embodiment, the present invention comprises a coating arrangement comprises the following features:
  particles having a Mohs hardness greater than or equal to 9 and a predefinable mean grain size,
  a coating having a thickness approximately corresponding to half of the mean grain size,
  a coating carrier having a surface comprising depressions, a proportion greater than 85% of the depressions being implemented having a depth less than approximately 10% and/or an opening width less than or equal to approximately 15% of the coating thickness in relation to a surface environment surrounding the particular depression, and
  the coating is applied to the surface of the coating carrier and encloses the particles at least in a lower area oriented toward the coating carrier.

In particular in that the surface of the coating carrier is implemented by grinding, for example, in such a manner that the furrowed depressions are implemented having a depth less than approximately 10% and/or an opening width less than approximately 15% of the coating thickness in relation to a surface environment surrounding the particular depression, optimum adhesion is ensured for the coating and the particles are simultaneously prevented from more or less disappearing into depressions in such a manner that they do not contribute to increasing the friction of the coating arrangement.

In an advantageous embodiment, the coating is implemented as electroplated nickel, so that an excellent protective layer against environmental influences which cause corrosion and other environmental influences is generated simultaneously for the coating carrier.

In an advantageous embodiment, the coating carrier is implemented as having a greater Mohs hardness and/or a greater tensile strength as a counter element, against which the coating arrangement is provided to be pressed against, so that if desired the areas of the particles protruding beyond the coating are pressed into the counter element and the coating below the particles and the area of the coating carrier below the particles are only slightly deformed in relation to the pressing into the counter element.

BRIEF DESCRIPTION OF THE SEVERAL VIEWS OF THE DRAWINGS

Further advantages, features, and details of the invention result from the exemplary embodiment of the invention described hereafter on the basis of the figures. In the figures.

DETAILED DESCRIPTION OF THE INVENTION

Figure 1:
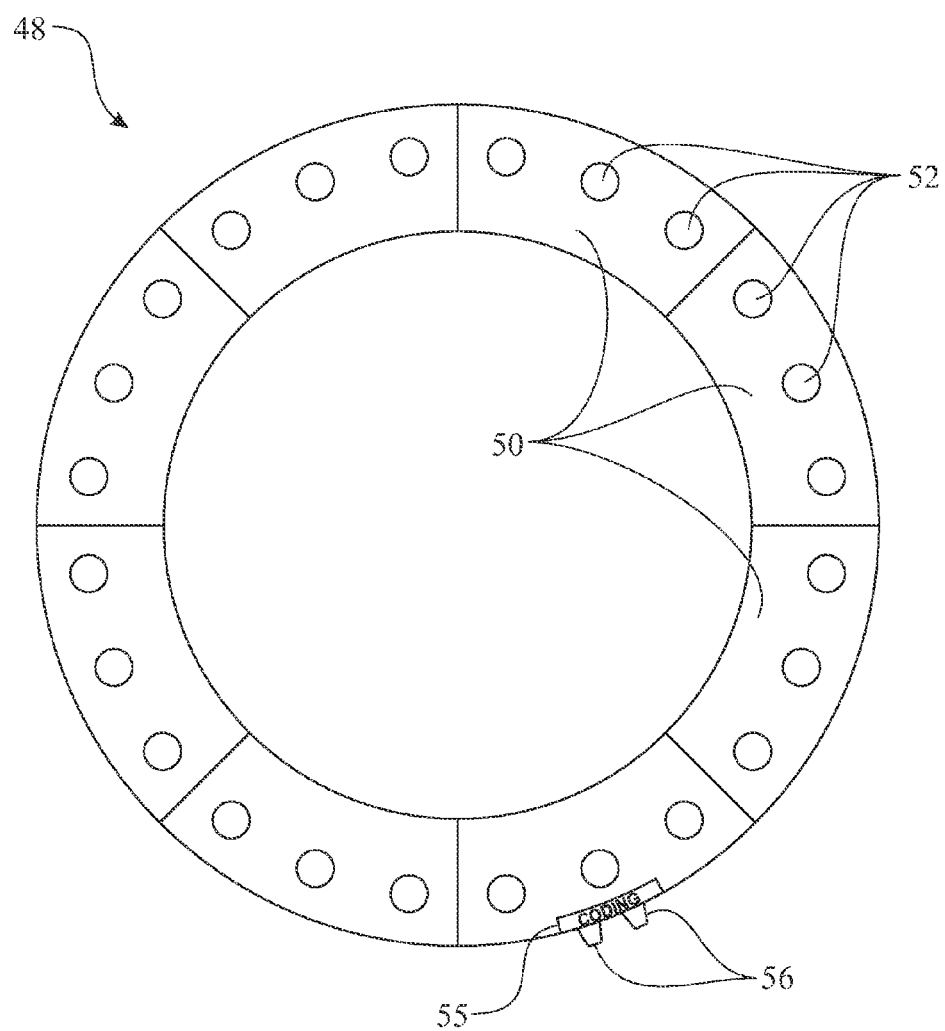
FIG. 1 shows a perforated-disk-like component on which a coating is applied
Figure 3:
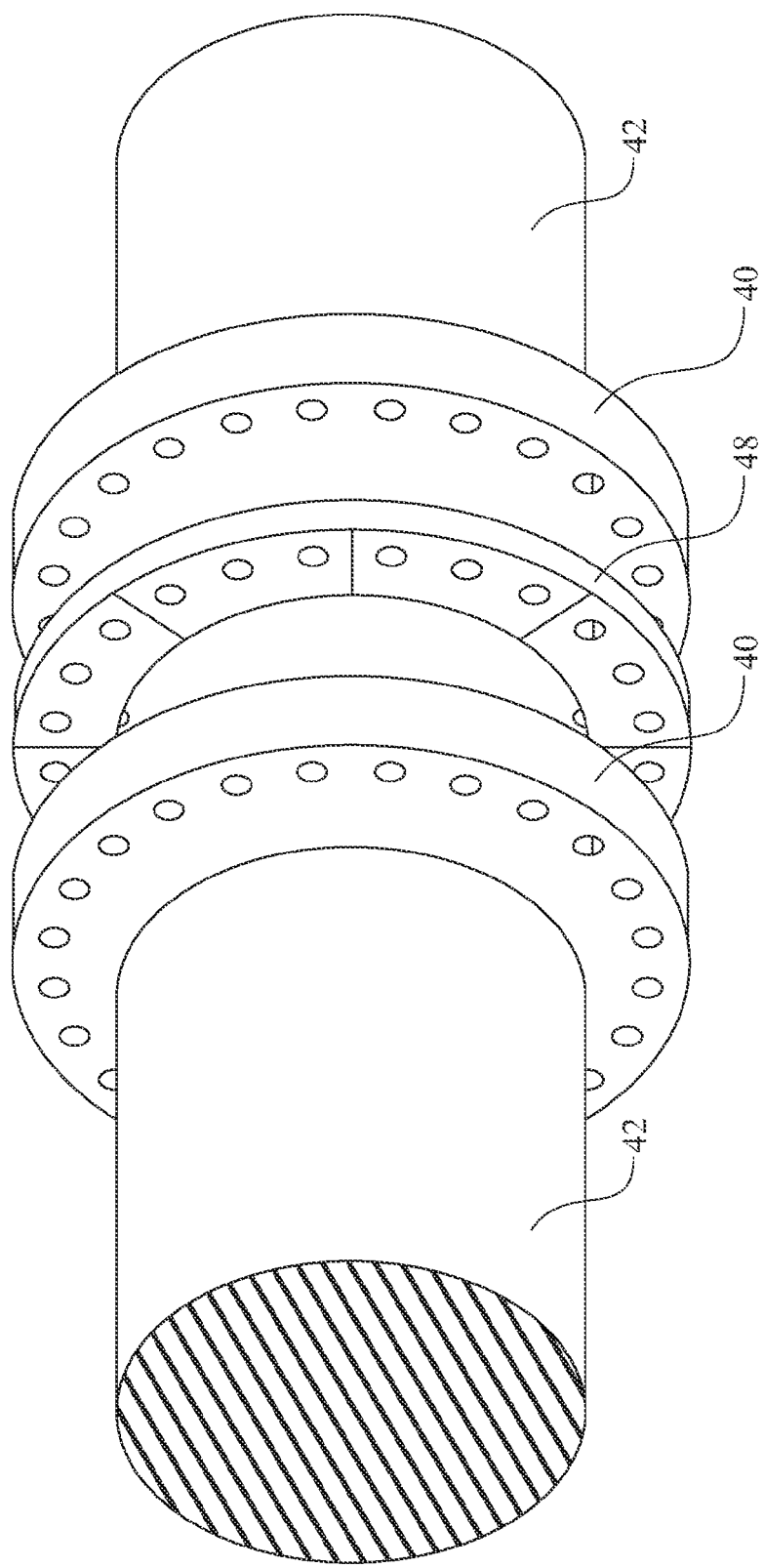
FIG. 3 shows and isometric exploded assembly view of the perforated disk-like component inserted between flange-like widened shaft ends of two shaft elements.

FIG. 1 shows a perforated-disk-like component which is provided with a coating as an exemplary embodiment of the invention. The perforated-disk-like component 48 is divided into a plurality of sector-like subelements 50, each of the subelements 50 comprising three holes 52. The perforated-disk-like component 48 is provided for use in the area of a shaft coupling 60 (FIG. 3), the perforated-disk-like component 48 being situated, for example, between flange-like widened shaft ends 40 (FIG. 3) of two shaft elements 42 to be connected to one another, such as a main shaft of a deep-sea wind power plant. The two flanges 40 of the two shaft elements 42 are also implemented having corresponding passages or pocket holes corresponding to the holes 52 of the perforated-disk-like component 48, so that the two flange-like shaft ends 40 can be screwed together through the holes 52, having the perforated-disk-like component 48 situated between them. In one embodiment, coding 55, such as teeth 56, can be implemented on the periphery of the perforated-disk-like component 48, so that it is possible to detect a shaft speed in this manner.

Figure 2:
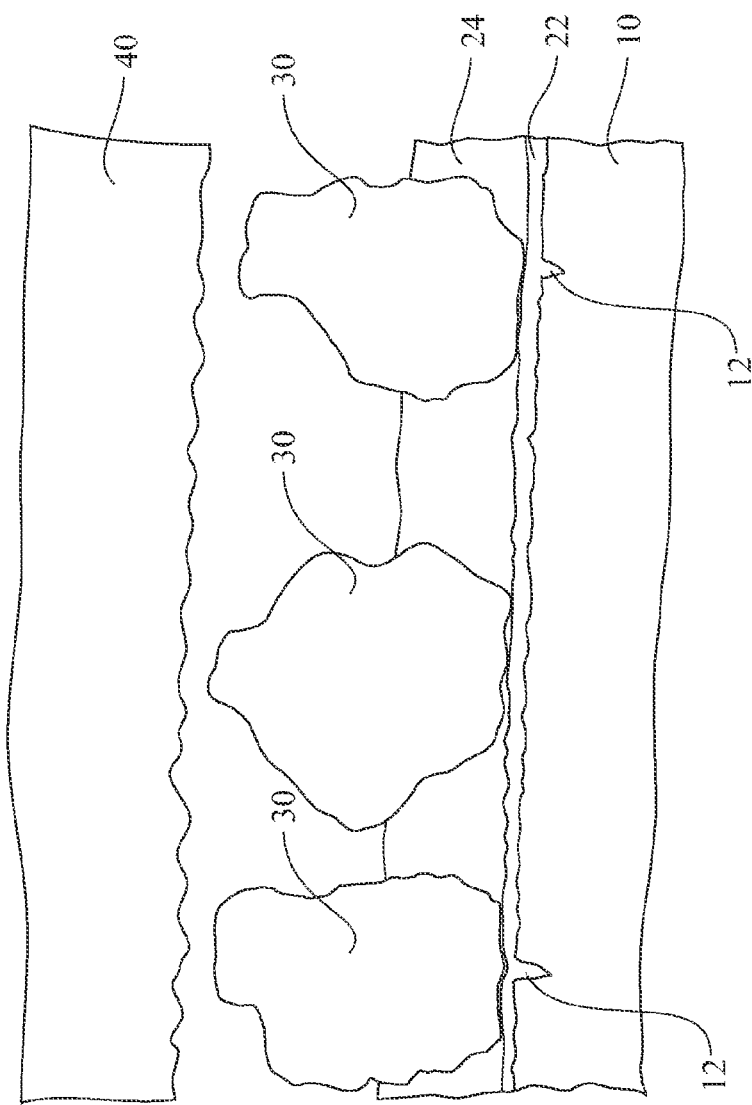
FIG. 2 shows a fundamental structure of the coating from FIG. 1.

In order that the two flange-like shaft ends 40 are connected to one another as fixedly as possible, the perforated-disk-like component 48 is implemented at least on its two front sides having a coating in the context of a coating arrangement. A schematic diagram of the coating arrangement is shown in FIG. 2. The perforated-disk-like component 48 comprises a coating carrier 10, which is implemented from a steel having a tensile strength between approximately 600 and 800 MPa and has a Mohs hardness of 6, the steel type Domex 500 MC being able to be used, for example. The frontal surfaces of the coating carrier 10 are implemented as ground in such a manner that the surface has a roughness of $R_a \leq 0.2$ μm and the furrowed depressions 12 caused by the grinding are implemented having a depth less than or equal to 4 μm and an opening width less than or equal to 6 μm in relation to a surface environment surrounding the particular depression 12.

A lower coating 22 made of nickel having a thickness of approximately 5 μm is then applied by electroplating to the coating carrier 10 ground in this manner. Particles 30 having a Mohs hardness of 10 and a mean grain size of approximately 120 μm, in particular round or blocky grain of a monocrystalline diamond, such as a natural diamond, are then laid on this lower coating 22. An upper coating 24 made of nickel is subsequently also applied thereon by electroplating, so that the particles 30 laid on the lower coating 22 are enclosed by the upper coating 24 at least in a lower area oriented toward the coating carrier 10. The upper coating 24 is applied up to a thickness of approximately 55 μm, so that the total thickness of the coating corresponds to approximately half of the mean grain size.

According to the preceding description, both front sides of the coating carrier 10 are accordingly implemented as coated. The two flange-like shaft ends 40 of the two shaft elements 42 are implemented from a material which has lesser values than the coating carrier 10 both in regard to Mohs hardness and also tensile strength, the shaft ends 40 being implemented in particular from gray cast iron, such as GG 40.3 having a tensile strength in the range between 400 and 500 MPa and a Mohs hardness of 5. The flange faces provided for application to the perforated-disk-like component 48 are implemented having a roughness in the range between 0.5 and 1.5 µm.

If the two shaft ends 40 are fixedly screwed together having the perforated-disk-like component 48 situated between them, the diamond particles 30 are pressed into the gray cast iron when the screw connection is formed so that the perforated-disk-like component 48 is connected in an interlocking manner to the shaft ends 40. Only a slight compression of the lower coating 22 situated below the particular diamond grain 30 and the coating carrier areas situated underneath occurs in the direction of the perforated-disk-like component 48 when the parts are screwed together. Coefficients of friction greater than 0.8 can particularly advantageously be implemented as described above. Furthermore, the nickel coating simultaneously represents an excellent corrosion protection for the coating carrier 10 made of steel, so that the perforated-disk-like component 48 is securely protected even against the most unfavorable weathering conditions.

For example, a number of screws may further advantageously be reduced upon use of the above-described coating in relation to conventional connections, with the same strength of the connection.

The invention claimed is:

1. A coupling comprising:
   two shaft elements of a deep-sea wind power plant system, each of the two shaft elements defining a connecting end comprising a flanged-shaped widened shaft end, each flange-shaped widened shaft end having a planar flange surface, the planar flange surface having a Mohs hardness,
   a perforated disk-shaped component having at least a front side and a side opposite to the front side, wherein the front side and the side opposite to the front side are formed having planar surfaces which are parallel with one another, the perforated disk shaped component being inserted between the respective planar flange surfaces of the flange shaped widened shaft ends of the two shaft elements,
   the front side planar surface having a plurality of depressions formed therein and the planar surface of side opposite the front side having a plurality of depressions formed therein, the front side planar surface, the planar surface opposite the front side planar surface and the plurality of depressions collectively defining a coating carrier,
   a coating arrangement applied to the coating carrier, the coating arrangement comprising:
      a plurality of particles each particle having a Mohs hardness of at least 9 and a predetermined mean grain size, and
      a coating applied to the coating carrier, so as to enclose the particles and having a thickness of about half of the particle mean grain size, wherein:
         the coating includes a lower coating applied to the surface of the coating carrier, the particles being disposed on the lower coating, and an upper coating applied to an exposed surface of the lower coating, and
         at least 85% of the depressions being formed such that each depression of the at least 85% of the depressions is surrounded by a surface environment and has at least one of a depth of less than about 10% of the coating thickness and an opening width of up to about 15% of the coating thickness in relation to a surface environment,
   wherein the flanged-shaped widened shaft ends are implemented from a material which has lesser values than the coating carrier both in regard to Mohs hardness and also tensile strength,
   wherein the perforated-disk-shaped component is assembled between the flanged-shaped widened shaft ends of the two shaft elements,
   wherein the coupling is arranged to transfer a torsional load from a first shaft element of the two shaft elements to a second shaft element of the two shaft elements using solely a combination of (a) friction between each planar flange surface of the respective shaft element and the planar surfaces of the respective mating side of the perforated disk-shaped component and (b) mechanical engagement of a fastener passing through each respective aligned series of perforations extending through the two shaft elements and the perforated disk-shaped component,
   wherein the friction includes a force provided by pressing the plurality of particles carried by the side of the perforated disk-shaped component into the respective flanged-shaped widened shaft end.

2. The coupling as claimed in claim 1, wherein each of greater than 99% of the depressions has at least one of a depth of less than about 10% of the coating thickness and an opening width of up to about 15% of the coating thickness in relation to a surface environment surrounding each depression.

3. The coupling as claimed in claim 1, wherein the depressions are formed such that each depression has a depth of up to 6 µm.

4. The coupling as claimed in claim 1, wherein the depressions are formed such that each depression has an opening width of less than about 8 µm.

5. The coupling as claimed in one claim 1, wherein the surface of the coating carrier is formed having a roughness Ra of up to 0.2 µm.

6. The perforated-disk-shaped component as claimed in claim 1, wherein the coating carrier is formed having a Mohs hardness of at least 5.

7. The coupling as claimed in claim 1, wherein the coating carrier is formed of a steel having a tensile strength within a range of about 600 MPa and about 800 MPa.

8. The coupling as claimed in claim 1, wherein the surface of the coating carrier is formed by grinding.

9. The coupling as claimed in claim 1, wherein the lower coating is formed having a thickness of about 5 µm.

10. The coupling as claimed in claim 1, wherein at least one of the first, lower coating and the second, upper coating includes nickel.

11. The coupling as claimed in claim 1, wherein at least one of the first, lower coating and the second, upper coating is applied by electroplating.

12. The coupling as claimed in claim 11, wherein the first, lower coating and the second, upper coating are formed of a same material.

13. The coupling as claimed in claim 1, wherein each of the particles has a Mohs hardness of 10.

14. The coupling as claimed in claim 1, wherein the particles include a monocrystalline diamond.

15. The coupling as claimed in claim 1, the coating arrangement further comprising a counter element having a Mohs hardness of about 5, the second, upper coating being pressed against the counter element.

16. The coupling as claimed in claim 1, the coating arrangement further comprising a counter element formed of gray cast iron having a tensile strength within a range of about 400 MPa and about 500 MPa, the second, upper coating being pressed against the counter element.

17. The coupling as claimed in claim 1, the coating arrangement further comprising a counter element having at least one of a hardness less than a hardness of the coating carrier and a tensile strength less than a tensile strength of the coating carrier, the second, upper coating being pressed against the counter element.

18. The coupling as claimed in claim 1, wherein the perforated-disk-shaped component is divided into a plurality of sector-like subelements.

19. The coupling as claimed in claim 1, wherein the perforated-disk-shaped component includes a plurality of axial passages for receiving fasteners.

20. The coupling as claimed in claim 1, wherein the perforated-disk-shaped component has coding on a periphery of the component and adapted for acquiring a shaft speed.

21. The coupling as claimed in claim 20, wherein the coding includes teeth.

22. The coupling as claimed in claim 1, wherein the plurality of particles are positioned upon the lower coating, wherein the particles are positioned resting upon an exposed finished surface of the lower coating and projecting outward from the exposed finished lower coating, and said upper coating is applied to the surface of the lower coating in an arrangement which encloses the particles and having a thickness such that the combined thickness of the lower coating and the upper coating is about half of the particle mean grain size.

23. The coupling as claimed in claim 1, wherein the coating has a thickness within a range of about 45 μm to about 75 μm.

\* \* \* \* \*